United States Patent
Sekine et al.

(10) Patent No.: US 12,455,019 B2
(45) Date of Patent: Oct. 28, 2025

(54) DIAGNOSIS APPARATUS, DIAGNOSIS METHOD, AND DIAGNOSIS PROGRAM FOR VALVE SYSTEM

(71) Applicant: MITSUBISHI HEAVY INDUSTRIES, LTD., Tokyo (JP)

(72) Inventors: Susumu Sekine, Kanagawa (JP); Tomoyuki Kojima, Kanagawa (JP); Hirofumi Ohara, Kanagawa (JP); Hiromitsu Mori, Kanagawa (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 431 days.

(21) Appl. No.: 17/927,171

(22) PCT Filed: Aug. 24, 2021

(86) PCT No.: PCT/JP2021/030944
§ 371 (c)(1),
(2) Date: Nov. 22, 2022

(87) PCT Pub. No.: WO2022/045114
PCT Pub. Date: Mar. 3, 2022

(65) Prior Publication Data
US 2023/0204128 A1 Jun. 29, 2023

(30) Foreign Application Priority Data
Aug. 31, 2020 (JP) .................. 2020-145424

(51) Int. Cl.
*F16K 37/00* (2006.01)
*F16K 31/124* (2006.01)
*G01M 13/003* (2019.01)
(52) U.S. Cl.
CPC ........ *F16K 37/0083* (2013.01); *F16K 31/124* (2013.01); *G01M 13/003* (2019.01)

(58) Field of Classification Search
CPC .............. F16K 37/0083; F16K 31/124; F16K 37/0041; F16K 37/0058; G01M 13/003
See application file for complete search history.

(56) References Cited

FOREIGN PATENT DOCUMENTS

| JP | 63-236939 | 10/1988 | |
|----|-----------|---------|---|
| JP | S 63236939 | * 10/1988 | ............ G01M 13/00 |

(Continued)

OTHER PUBLICATIONS

International Search Report issued Nov. 2, 2021 in International Application No. PCT/JP2021/030944, with English translation.

(Continued)

*Primary Examiner* — Alexander Satanovsky
(74) *Attorney, Agent, or Firm* — Wenderoth, Lind & Ponack, L.L.P.

(57) ABSTRACT

A diagnosis apparatus for a valve system including a control valve, a servo valve for driving the control valve, and at least one servo module for providing a control signal based on an opening degree command value for the control valve to the servo valve is provided with: at least one opening degree detection part configured to detect an actual opening degree of the control valve; and a diagnosis part configured to acquire, from the opening degree detection part, a detected value of the actual opening degree of the control valve while a diagnostic opening degree command value is input to the at least one servo module, and diagnose an abnormality of the valve system on the basis of the detected value. The diagnostic opening degree command value changes in multiple steps between a maximum opening degree and a minimum opening degree through one or more intermediate opening degrees.

12 Claims, 13 Drawing Sheets

(56) References Cited

FOREIGN PATENT DOCUMENTS

| JP | 63-288894 | | 11/1988 | | |
| JP | 2010-39715 | | 2/2010 | | |
| JP | 2010039715 | * | 2/2010 | ............ | G05B 23/02 |
| JP | 5122398 | | 1/2013 | | |
| JP | 2016-50785 | | 4/2016 | | |
| JP | 2019117122 | * | 7/2019 | ............ | G01M 3/26 |
| JP | 2020-8036 | | 1/2020 | | |
| JP | 2020008036 | * | 1/2020 | ............ | F16K 51/00 |

OTHER PUBLICATIONS

International Preliminary Report on Patentability issued Mar. 9, 2023 in International Application No. PCT/JP2021/030944, with English translation.

\* cited by examiner

FIG. 8

| | 75-100% | Operating value | | Threshold | Diagnosis result |
|---|---|---|---|---|---|
| Operation delay time (s) | | 0.1 | sec | <0.3 sec | GOOD |
| Overshoot amount (%) | | 0.2 | % | <0.5 % | GOOD |
| Settling time (s) | | 1.3 | sec | <1.0 sec | NG |
| Residual deviation (%) | | -0.4 | % | -1.5 ~1.5 % | GOOD |

DIAGNOSIS APPARATUS, DIAGNOSIS METHOD, AND DIAGNOSIS PROGRAM FOR VALVE SYSTEM

TECHNICAL FIELD

The present disclosure relates to a diagnosis apparatus, a diagnosis method, and a diagnosis program for a valve system.

The present application claims priority based on Japanese Patent Application No. 2020-145424 tiled on Aug. 31, 2020, the entire content of which is incorporated herein by reference.

BACKGROUND ART

For a valve system including a control valve driven by a servo valve, abnormality diagnosis may be performed based on responsiveness when a control signal is provided to the servo valve.

For example, Patent Document 1 discloses inputting a step signal indicating an opening degree command value of a valve (control valve) driven by a servo valve to the servo valve and inspecting the valve based on step responsiveness. In Patent Document 1, a step signal that changes between an open degree command value indicating full opening of the valve and an open degree command value indicating full closing of the valve is used to inspect the control characteristics when the valve is driven at full speed between the fully open and fully closed positions. Further, in Patent Document 1, a step signal corresponding to each of discrete opening degree ranges (25±5%, 50±5%, and 75±5%) is used to inspect a step response of the valve in each opening degree range.

CITATION LIST

Patent Literature

Patent Document 1: JP5122398B

SUMMARY

Problems to be Solved

As described in Patent Document 1, for example, when using a step signal that changes between an opening degree command value indicating full opening of the control valve and an opening degree command value indicating full closing of the control valve, even if the presence or absence of an abnormality in the control valve can be detected, it is difficult to identify the opening degree of the control valve at which the abnormality occurs. Further, as described in Patent Document 1, for example, when using a step signal corresponding to each of discrete opening degree ranges, it is not possible to detect an abnormality that occurs at opening degrees not included in these ranges.

In view of the above, an object of at least one embodiment of the present invention is to provide a diagnosis apparatus, a diagnosis method, and a diagnosis program for a valve system whereby it is possible to diagnose the valve system in more detail.

Solution to the Problems

A diagnosis apparatus for a valve system according to at least one embodiment of the present invention is a diagnosis apparatus for a valve system including a control valve, a servo valve for driving the control valve, and at least one servo module for providing a control signal based on an opening degree command value for the control valve to the servo valve. The diagnosis apparatus includes: at least one opening degree detection part configured to detect an actual opening degree of the control valve; and a diagnosis part configured to acquire, from the opening degree detection part, a detected value of the actual opening degree of the control valve while a diagnostic opening degree command value is input to the at least one servo module, and diagnose an abnormality of the valve system on the basis of the detected value. The diagnostic opening degree command value changes in multiple steps between a maximum opening degree and a minimum opening degree through one or more intermediate opening degrees.

A diagnosis method for a valve system according to at least one embodiment of the present invention is a diagnosis method for a valve system including a control valve, a servo valve for driving the control valve, and at least one servo module for providing a control signal based on an opening degree command value for the control valve to the servo valve. The diagnosis method includes: a step of inputting, to the at least one servo module, a diagnostic opening degree command value which changes in multiple steps between a maximum opening degree and a minimum opening degree through one or more intermediate opening degrees; a step of acquiring a detected value of an actual opening degree of the control valve while the diagnostic opening degree command value is input to the at least one servo module; and a step of diagnosing an abnormality of the valve system on the basis of the detected value.

A diagnosis program for a valve system according to at least one embodiment of the present invention is a diagnosis program for a valve system including a control valve, a servo valve for driving the control valve, and at least one servo module for providing a control signal based on an opening degree command value for the control valve to the servo valve. The diagnosis program is configured to cause a computer to execute: a process of inputting, to the at least one servo module, a diagnostic opening degree command value which changes in multiple steps between a maximum opening degree and a minimum opening degree through one or more intermediate opening degrees; a process of acquiring a detected value of an actual opening degree of the control valve while the diagnostic opening degree command value is input to the at least one servo module; and a process of diagnosing an abnormality of the valve system on the basis of the detected value.

Advantageous Effects

At least one embodiment of the present invention provides a diagnosis apparatus, a diagnosis method, and a diagnosis program for a valve system whereby it is possible to diagnose the valve system in more detail.

BRIEF DESCRIPTION OF DRAWINGS

FIG. 8 is a diagram showing an example of display of diagnosis results of the valve system.

DETAILED DESCRIPTION

Embodiments of the present invention will now be described in detail with reference to the accompanying drawings. It is intended, however, that unless particularly identified, dimensions, materials, shapes, relative positions, and the like of components described in the embodiments shall be interpreted as illustrative only and not intended to limit the scope of the present invention.

Configuration of Valve System

Figure 1:
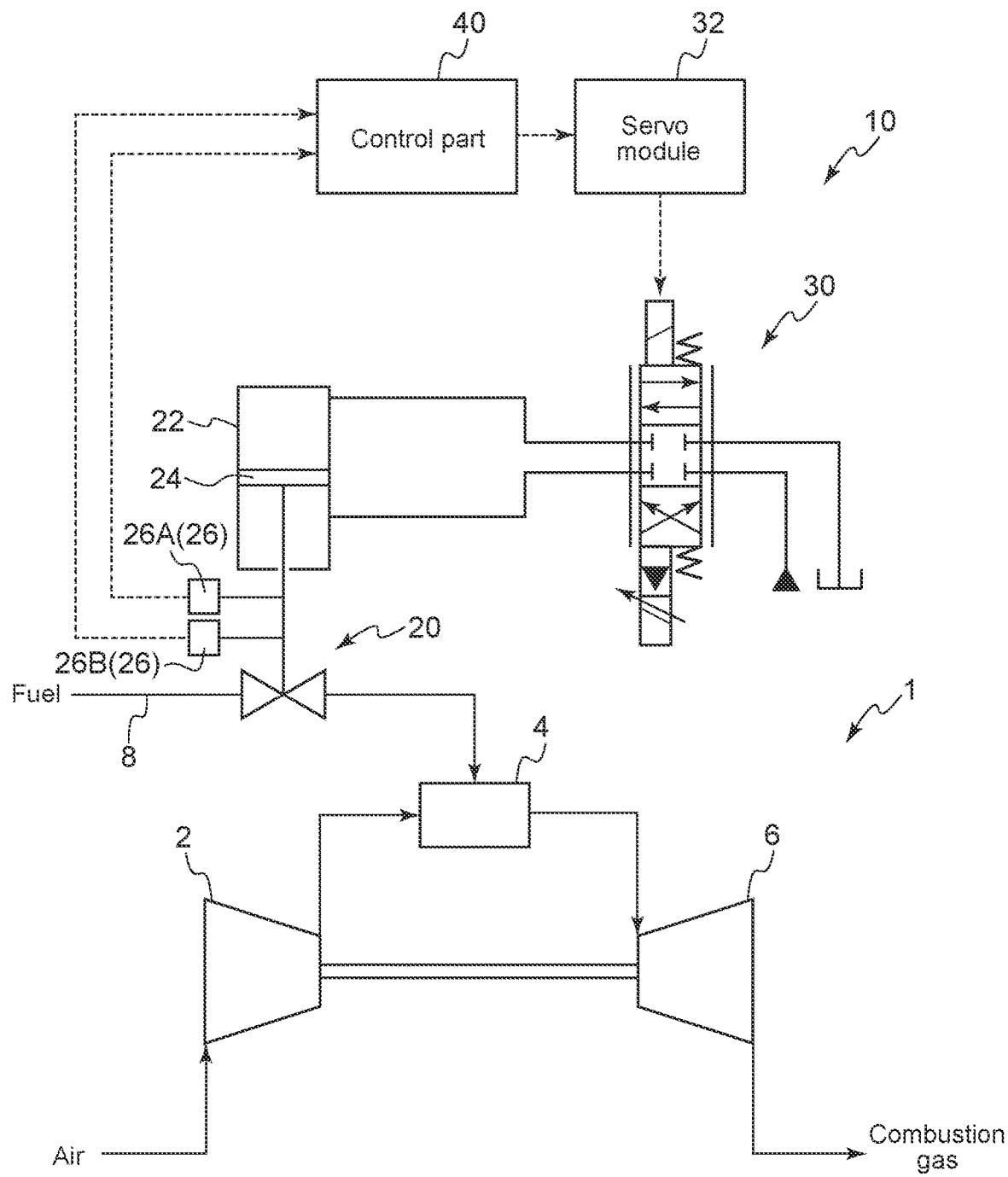
FIG. 1 is a schematic configuration diagram of a valve system to which a diagnosis apparatus is applied according to an embodiment.
Figure 2:
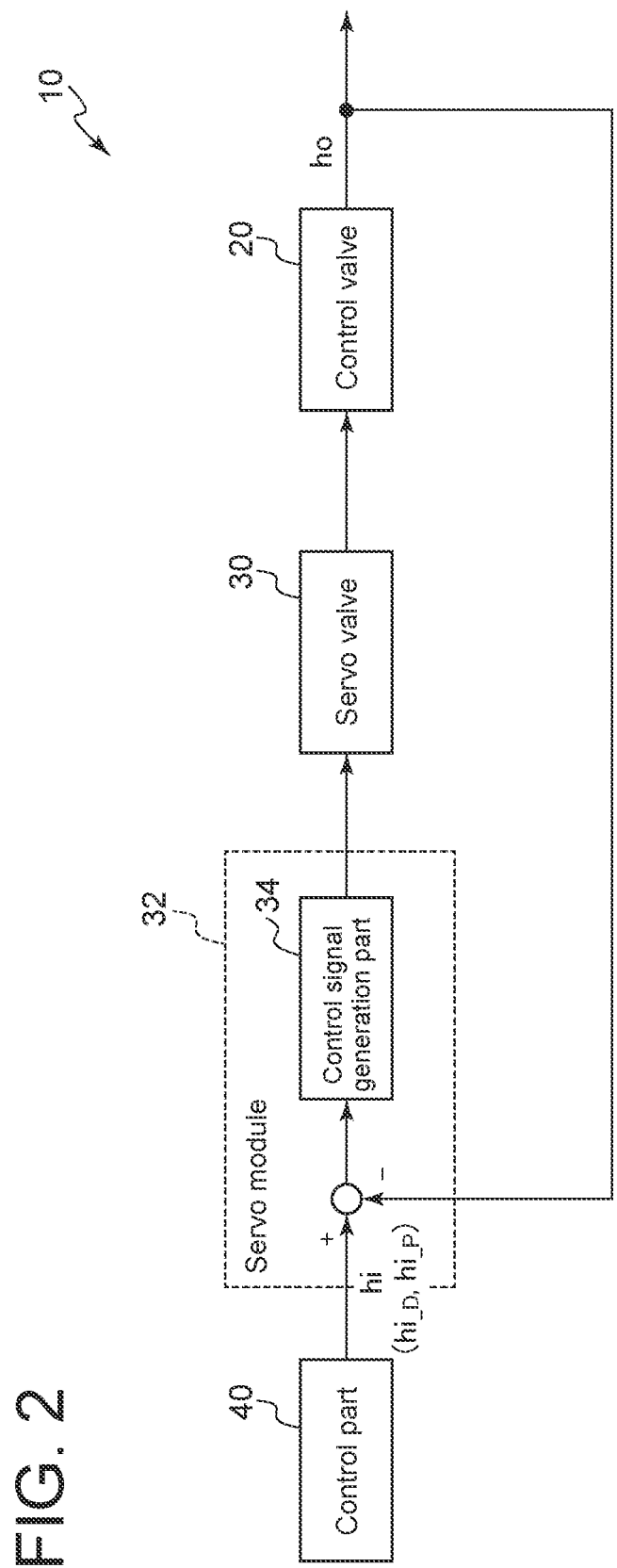
FIG. 2 is a block diagram for the control of a control valve in the valve system according to an embodiment.

FIG. 1 is a schematic configuration diagram of a valve system to which a diagnosis apparatus is applied according to an embodiment. FIG. 2 is a block diagram for the control of a control valve in the valve system according to an embodiment.

As shown in FIG. 1, the valve system 10 includes a control valve 20, a servo valve 30 for driving the control valve 20, and a servo module 32 for providing a control signal to the servo valve 30.

The control valve 20 is a valve capable of controlling the flow of fluid. In the exemplary embodiment shown in FIG. 1, the control valve 20 is a fuel valve for regulating the flow rate of fuel supplied to a combustor 4 of a gas turbine 1. The gas turbine 1 includes a compressor 2 for compressing air, a combustor 4 for burning fuel using the compressed air from the compressor 2 as an oxidant, and a turbine 6 configured to be driven by the combustion gas from the combustor 4. The control valve 20 is disposed on a fuel supply line 8 for supplying fuel to the combustor 4.

In some embodiments, the control valve 20 may be the above-described fuel valve. Alternatively, in some embodiments, the control valve 20 may be an inlet guide vane or a variable stator vane disposed in the compressor 2.

The control valve 20 shown in FIG. 1 is driven by a hydraulic actuator including a cylinder 22 and a piston 24 configured to reciprocate within the cylinder 22. The valve body of the control valve 20 is connected to the piston 24 via a rod so that the valve body and the piston 24 move linearly together. The opening degree of the control valve 20 is minimum when the valve body is seated on the valve seat (opening degree is zero), and increases as the distance between the valve body and the valve seat in the opening/closing direction of the valve body (i.e., the reciprocating direction of the piston 24) increases.

As shown in FIG. 1, the control valve 20 is provided with an opening degree detection part 26 for detecting the actual opening degree of the control valve 20. The opening degree detection part 26 may be configured to detect the actual opening degree of the control valve 20, based on the position of the valve body or a member (e.g., piston or rod) that moves together with the valve body in the opening/closing direction of the control valve 20.

The servo module 32 is configured to receive an opening degree command value for the control valve 20 from a control part 40 and provide a control signal based on the opening degree command value to the servo valve 30. As shown in FIG. 2, the servo module 32 includes a control signal generation part 34 for generating a control signal provided to the servo valve 30. The servo module 32 receives the above-described opening degree command value hi from the control part 40 and receives a feedback signal indicating the actual opening degree ho of the control valve 20 detected by the opening degree detection part 26. The control signal generation part 34 generates the control signal based on the deviation between the opening degree command value (target opening degree) hi and the actual opening degree ho. The control signal generation part 34 may be configured to generate the control signal by performing a proportional calculation based on the deviation. The generated control signal is sent to the servo valve 30.

The servo valve 30 is configured to drive the control valve 20, based on the control signal from the servo module 32. That is, the control signal from the servo module 32 controls the supply of pressurized oil to the cylinder 22 via the servo valve 30 and the discharge of pressurized oil from the cylinder 22 via the servo valve 30, thus controlling the opening degree of the control valve 20.

Figure 3:
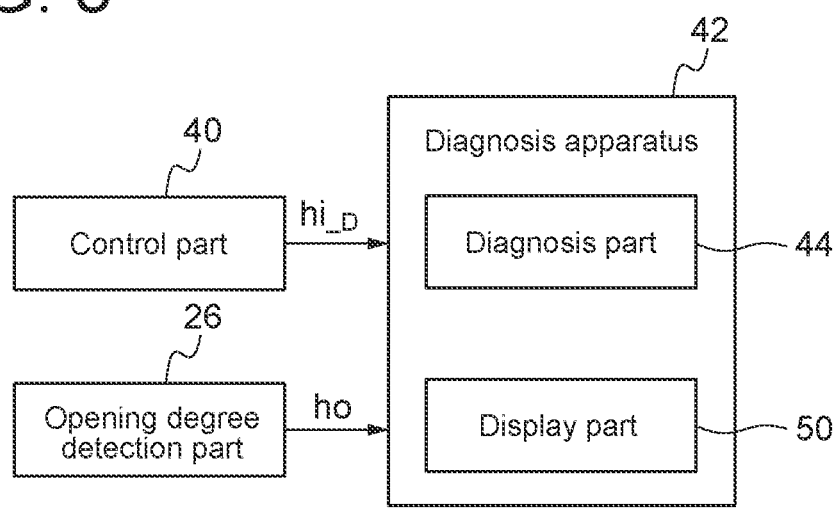
FIG. 3 is a schematic configuration diagram of the diagnosis apparatus for the valve system according to an embodiment.

FIG. 3 is a schematic configuration diagram of the diagnosis apparatus for the valve system 10 according to an embodiment. As shown in FIG. 3, the diagnosis apparatus 42 includes a diagnosis part 44 for diagnosing an abnormality of the valve system 10. The diagnosis part 44 is configured to acquire, from the opening degree detection part 26, a detected value of the actual opening degree of the control valve 20 while the diagnostic opening degree command value from the control part 40 is input to the servo module 32, and diagnose an abnormality of the valve system 10, based on the detected value. The diagnostic opening degree command value is a kind of the opening degree command value (opening degree command value for the control valve 20) sent from the control part 40 to the servo module 32, and is used for abnormality diagnosis of the valve system 10. As will be described later, the diagnostic opening degree command value changes in multiple steps between the maximum opening degree and the minimum opening degree through one or more intermediate opening degrees.

The diagnosis apparatus 42 may include a display part 50 (e.g., display) for displaying information based on the diagnosis result by the diagnosis part 44 or the detected value of the opening degree of the control valve 20 by the opening degree detection part 26.

The control part 40 and the diagnosis part 44 include a computer equipped with a processor (e.g., CPU), a storage device (memory device; e.g., RAM), an auxiliary storage part, and an interface. The control part 40 and the diagnosis part 44 receive signals from the opening degree detection part 26 via an interface. The processor is configured to process the signals thus received. In addition, the processor is configured to process programs loaded into the storage device. Thereby, the functions of the control part 40 and the diagnosis part 44 are implemented. The control part 40 and the diagnosis part 44 may be configured by a common computer.

Diagnosis Flow of Valve System

Hereinafter, the diagnosis method for the valve system 10 according to some embodiments will be described. In the following, the case of diagnosing the valve system 10 using the diagnosis apparatus 42 will be described, but in some embodiments, another apparatus may be used to diagnose the valve system 10. Further, a part or the whole of the procedure described below may be performed manually.

Figure 4:
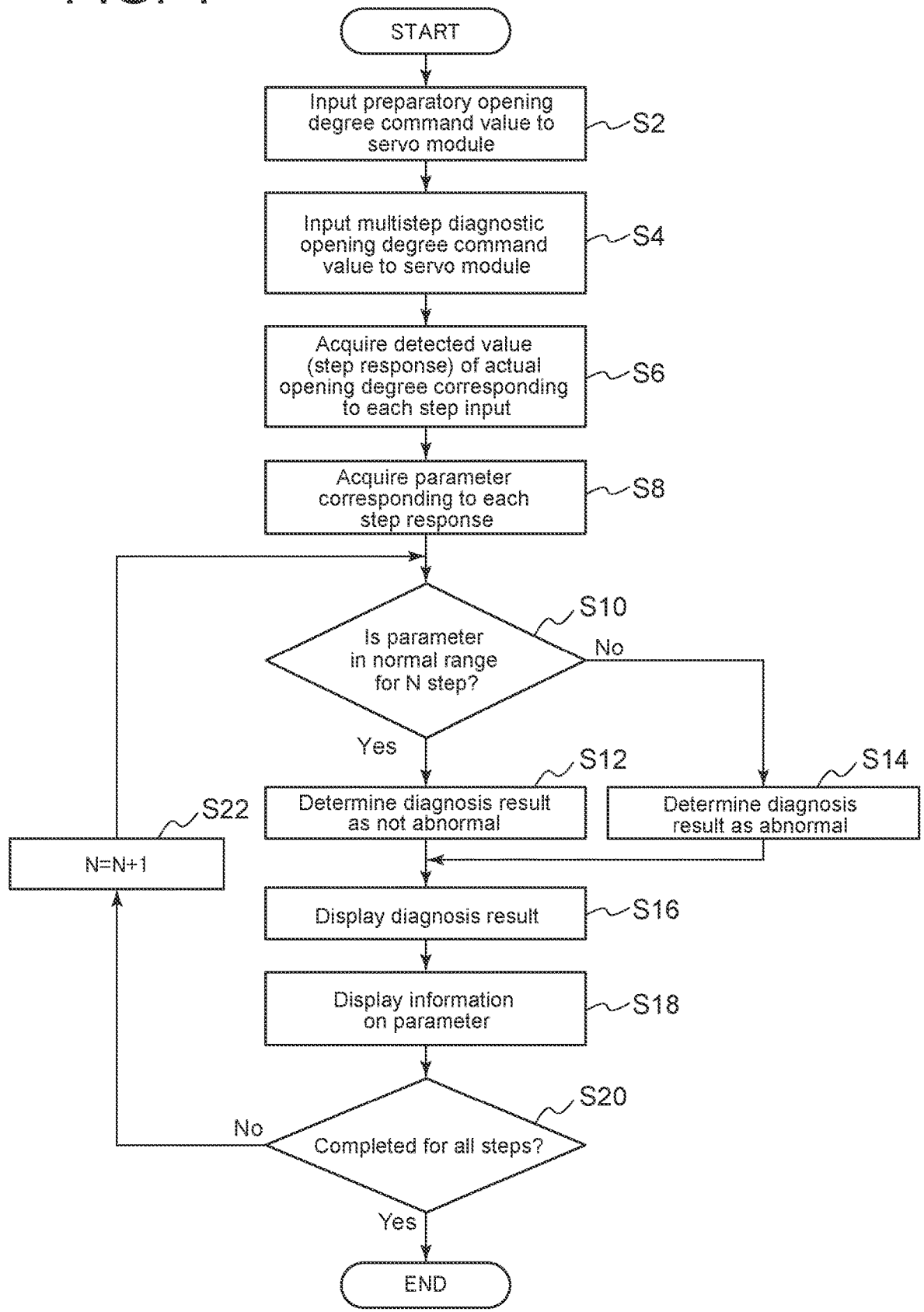
FIG. 4 is a flowchart of the diagnosis method for the valve system according to an embodiment.

FIG. 4 is a flowchart of the diagnosis method for the valve system 10 according to an embodiment. In an embodiment, the multistep diagnostic opening degree command value from the control part 40 is input to the servo module 32 (S4). As will be described later in detail, a preparatory opening degree command value may be input to the servo module 32 in step S2 prior to step S4.

Figure 5:
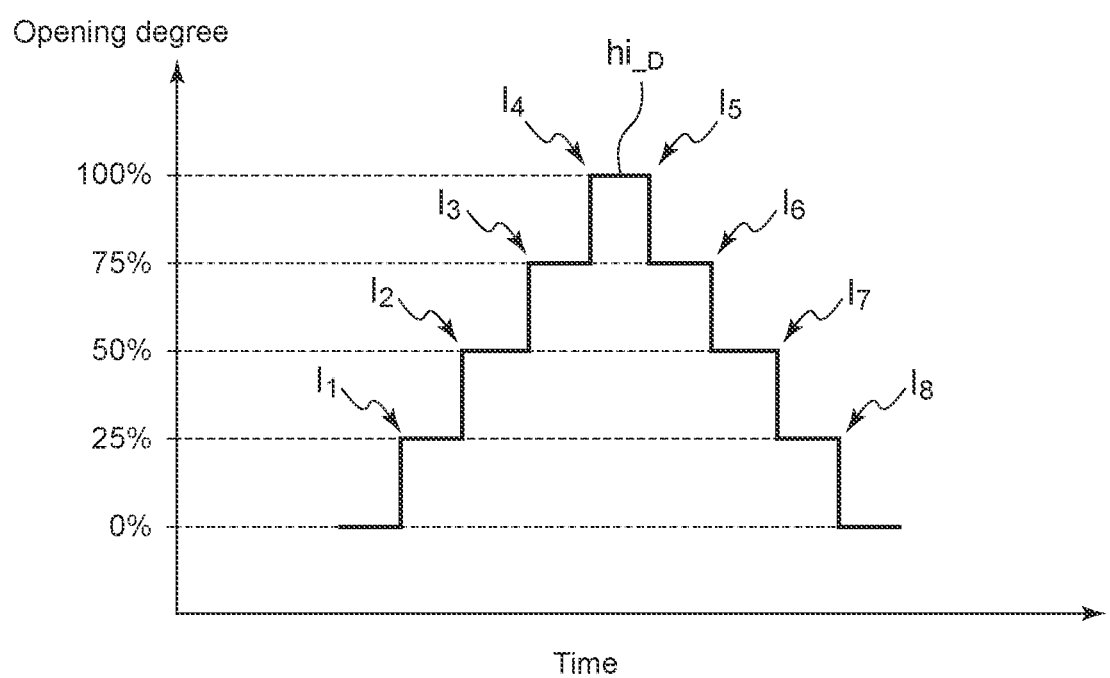
FIG. 5 is a graph showing temporal changes in the opening degree command value (diagnostic opening degree command value) input to the servo valve according to an embodiment.

FIG. 5 is a graph showing temporal changes in the opening degree command value (diagnostic opening degree command value) according to an embodiment. For example, as shown in FIG. 5, the diagnostic opening degree command value $hi_D$ input to the servo module 32 in step S4 changes in multiple steps between the maximum opening degree and the minimum opening degree through one or more intermediate opening degrees. In other words, the diagnostic opening degree command value $hi_D$ varies continuously between the maximum opening degree and the minimum opening degree through intermediate opening degrees, and takes all values between the maximum opening degree and the minimum opening degree. The diagnostic opening degree command value $hi_D$ shown in FIG. 5 changes in multiple steps between the minimum opening degree 0% (opening degree in the fully closed position of the control valve 20) and the maximum opening degree 100% (opening degree in the fully open position of the control valve 20) through intermediate opening degrees 25%, 50%, and 75%.

That is, the servo module 32 is provided with multiple step inputs I1 to I8 (see FIG. 5) indicating the diagnostic opening degree command value $hi_D$. Each of the step inputs I1 to I8 has as an initial value the first opening degree which is one of the minimum opening degree, the maximum opening degree, and the intermediate opening degrees, and as a target value the second opening degree which is another one of the minimum opening degree, the maximum opening degree, and the intermediate opening degrees.

More specifically, the diagnostic opening degree command value $hi_D$ shown in FIG. 5 increases multi-stepwise from the minimum opening degree 0% to the maximum opening degree 100% through the intermediate opening degrees 25%, 50%, and 75% (step inputs I1 to I4), and then decreases multi-stepwise from the maximum opening degree 100% to the minimum opening degree 0% through the intermediate opening degrees 70%, 50%, and 25% (step inputs I5 to I8). In this case, the initial value (opening degree) to target value (opening degree) of the step inputs I1 to I8 are respectively I1: 0% to 25%, I2: 25% to 50%, I3: 50% to 75%, I4: 75% to 100%, I5: 100% to 75%, I6: 75% to 50%, I7: 50% to 25%, and I8: 25% to 0%.

In some embodiments, the minimum opening degree of the diagnostic opening degree command value $hi_D$ may be greater than 0%. In some embodiments, the maximum opening degree of the diagnostic opening degree command value $hi_D$ may be smaller than 100%.

Here, the valve position with 100% opening degree of the control valve 20 does not necessarily have to be the valve position with the physically possible maximum opening degree of the control valve 20. That is, the definition of the valve position with 100% opening degree of the control valve 20 may be decided artificially.

Figure 6:
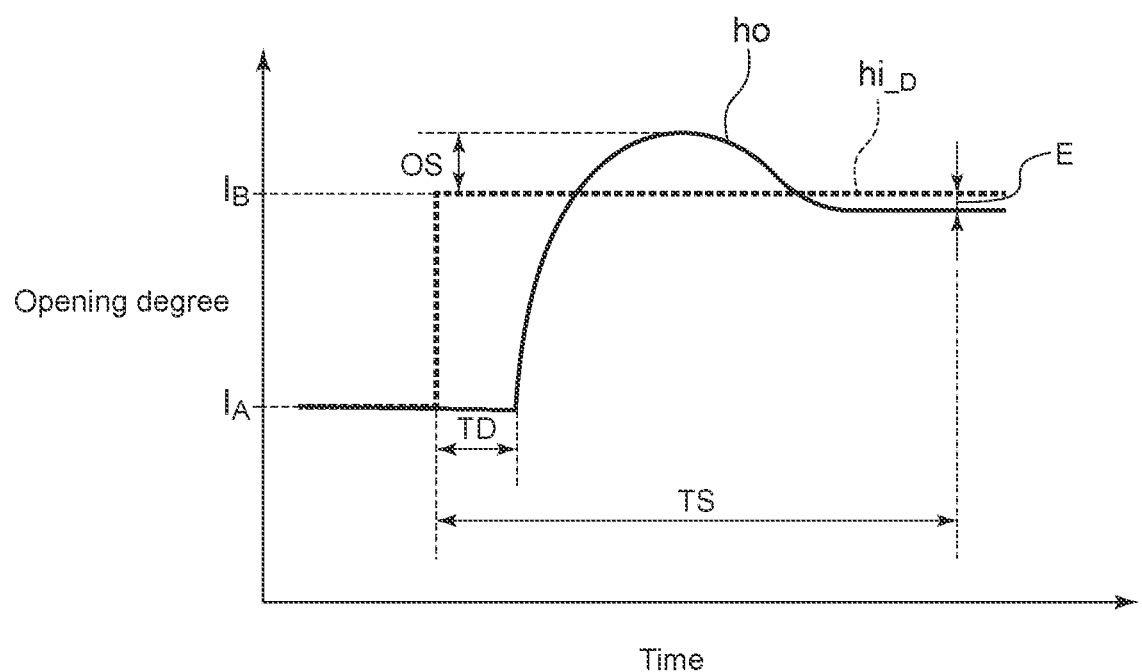
FIG. 6 is a graph showing a typical example of temporal changes in the diagnostic opening degree command value input to the servo module and corresponding actual opening degrees of the control valve.

While the diagnostic opening degree command value is input to the servo module 32 in step S4, the diagnosis part 44 acquires the detected value of the actual opening degree of the control valve 20 obtained 1w the opening degree detection part 26 (step S6). Here, FIG. 6 is a graph showing a typical example of temporal changes in the multistep opening degree command value input to the servo module at one step (any one of step inputs I1 to I8) and corresponding actual opening degrees ho of the control valve 20. The step input shown in FIG. 6 has the opening degree $I_A$ as the initial value and the opening degree $I_B$ as the target value.

As shown in FIG. 6, when the step input indicating the diagnostic opening degree command value $hi_D$ is provided to the servo module 32, a step response is obtained as the detected value of the actual opening degree ho. That is, when multiple step inputs I1 to I8 indicating the diagnostic opening degree command value $hi_D$ are provided in step S4, the step response of the detected value of the actual opening degree ho is obtained for each of the step inputs I1 to I8.

Then, an abnormality of the valve system 10 is diagnosed based on the detected value of the actual opening degree ho of the control valve 20 obtained in step S6, i.e., the multiple step responses corresponding to the multiple step inputs I1 to I8 (S8 to S22).

In some embodiments, in step S8, the diagnosis part 44 acquires a parameter associated with each of the step responses of the actual opening degree ho to the step inputs (I1 to I8) of the multistep diagnostic opening degree command value $hi_D$. The parameter may be operation delay time TD, overshoot amount OS, settling time TS, or residual deviation E (see FIG. 6) of the actual opening ho in response to each of the step inputs I1 to I8 of the diagnostic opening degree command value $hi_{\_D}$.

Then, in step S10, an abnormality of the valve system 10 is diagnosed based on the parameter acquired in step S8. In step S10, the presence or absence of an abnormality in the valve system 10 may be determined based on the comparison between the parameter and a threshold.

In an embodiment, in step S10, if the operation delay time TD is equal to or less than the threshold, the valve system 10 is determined to have no abnormality (Yes in S10), and in step S12, the diagnosis result is determined as not abnormal. In step S10, if the operation delay time TD is more than the threshold, the valve system 10 is determined to have an abnormality (No in S10), and in step S14, the diagnosis result is determined as abnormal.

In an embodiment, in step S10, if the overshoot amount OS is equal to or less than the threshold, the valve system 10 is determined to have no abnormality (Yes in S10), and in step S12, the diagnosis result is determined as not abnormal. In an embodiment, in step S10, if the overshoot amount OS is more than the threshold, the valve system 10 is determined to have an abnormality (No in S10), and in step S14, the diagnosis result is determined as abnormal.

In an embodiment, in step S10, if the settling time TS is equal to or less than the threshold, the valve system 10 is determined to have no abnormality (Yes in S10), and in step S12, the diagnosis result is determined as not abnormal. In step S10, if the settling time TS is more than the threshold, the valve system 10 is determined to have an abnormality (No in S10), and in step S14, the diagnosis result is determined as abnormal.

In an embodiment, in step S10, if the absolute value of the residual deviation E is equal to or less than the threshold, the valve system 10 is determined to have no abnormality (Yes in S10), and in step S12, the diagnosis result is determined as not abnormal. In an embodiment, in step S10, if the absolute value of the residual deviation E is more than the threshold, the valve system 10 is determined to have an abnormality (No in S10), and in step S14, the diagnosis result is determined as abnormal.

In step S16, the display part 50 displays the diagnosis results of the valve system 10 obtained in steps S10 to S14.

In step S18, the display part 50 displays, for each step, information on one or more parameters associated with the step response of the actual opening degree ho to the step input at each step of the multistep diagnostic opening degree command value $hi_{\_D}$.

Steps S10 to S18 may be sequentially performed one step at a time for the multistep diagnostic opening degree command values $hi_{\_D}$ (I1 to I8) (steps S20 to S22).

FIGS. 7A to 7D are each a graph showing an example of parameters associated with the step response of the actual opening degree ho obtained in response to the step input (I1 to I8) at each step of the diagnostic opening degree command value $hi_{\_D}$, and show the operation delay time TD, overshoot amount OS (represented as a ratio to the range (target value-initial value) of the step input), setting time TS, and residual deviation E of the step response corresponding to each step input (I1 to I8; horizontal axis), respectively. FIGS. 7A to 7D show lines (dashed lines) indicating thresholds for each parameter.

In step S18 described above, the display part 50 may display the graphs shown in FIGS. 7A to 7D.

FIG. 8 is a diagram showing an example of display of diagnosis results of the valve system 10 by the display part 50. FIG. 8 shows the values of parameters associated with the step response, thresholds for the parameters, and diagnosis results of the valve system 10 based on the parameters for the step input I4 of the diagnostic opening degree command value $hi_{\_D}$ (step input with initial value 75% and target value 100% of the diagnostic opening degree command value $hi_{\_D}$).

As can be seen from the graphs of FIGS. 7A to 7D, the operation delay time TD, overshoot amount OS, settling time TS, and residual deviation E of the step responses corresponding to the step inputs I1 to I3 and I5 to I8 of the diagnostic opening degree command value $hi_{\_D}$ are less than the respective thresholds. Therefore, it is determined that no abnormality has occurred in the valve system 10 in the section of opening the control valve 20 from 0% to 75% opening degree and the section of closing the control valve 20 from 100% to 0% opening degree.

Figure 7A:
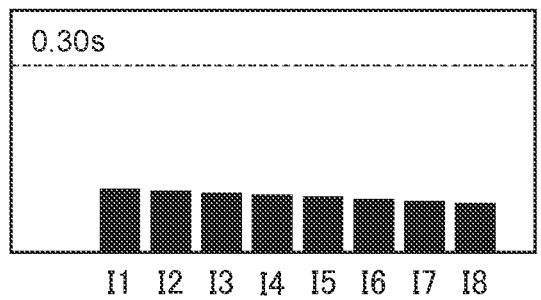
FIG. 7A is a graph showing an example of parameters associated with the step response of the actual opening degree obtained in response to the step input at each step of the diagnostic opening degree command value.
Figure 7B:
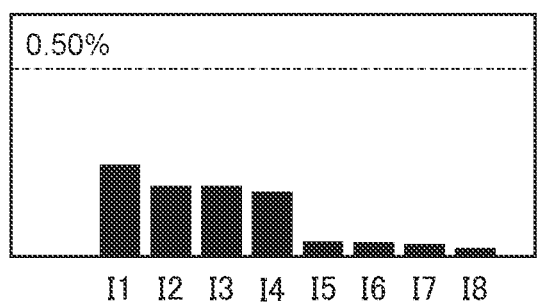
FIG. 7B is a graph showing an example of parameters associated with the step response of the actual opening degree obtained in response to the step input at each step of the diagnostic opening degree command value.
Figure 7C:
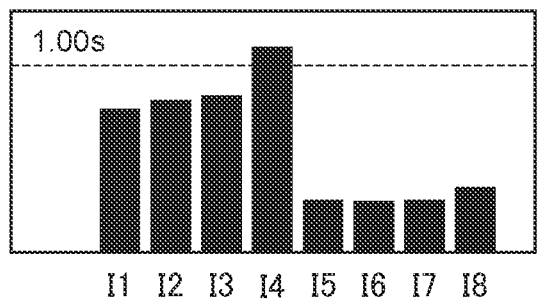
FIG. 7C is a graph showing an example of parameters associated with the step response of the actual opening degree obtained in response to the step input at each step of the diagnostic opening degree command value.
Figure 7D:
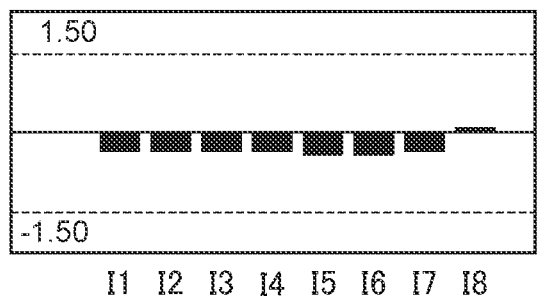
FIG. 7D is a graph showing an example of parameters associated with the step response of the actual opening degree obtained in response to the step input at each step of the diagnostic opening degree command value.

On the other hand, in the graph of FIG. 7C, the settling time (see FIG. 7C) of the step response corresponding to the step input I4 of the diagnostic opening degree command value $hi_{\_D}$ (step input with initial value 75% and target value 100% of the diagnostic opening degree command value $hi_{\_D}$) exceeds the threshold. Therefore, as indicated by the diagnosis results shown in FIG. 8, in the range where the opening degree of the control valve 20 is 75% to 100%, the determination result of the settling time is "NG", and it can be determined that some abnormality has occurred in the valve system 10.

In the above-described embodiment, since the abnormality diagnosis is performed using the control signal corresponding to the diagnostic opening degree command value $hi_{\_D}$ covering the entire range between the maximum opening degree (100%) and the minimum opening degree (0%) of the control valve 20, an abnormality of the control valve 20 can be easily detected without omission. Additionally, since the diagnosis is made using the control signal corresponding to the diagnostic opening degree command value $hi_{\_D}$ (step input) which changes in multiple steps between the maximum opening degree (100%) and the minimum opening degree (0%) of the control valve 20 through intermediate openings (25%, 50%, 70%), by evaluating the step response for each step of the multiple step inputs, it is possible to identify which step of the step inputs has caused the detected abnormality. For example, as described above, in the example shown in FIGS. 7A to 8, the detection of abnormality can be identified based on the step input I4 with initial value 75% and target value 100% for the diagnostic opening degree command value $hi_{\_D}$, and thus it can be determined that an abnormality (e.g., sticking of the control valve 20) has occurred in the valve system 10 in the range where the opening degree of the control valve 20 is 75% to 100%. Thus, in the above-described embodiment, it is possible to identify the range in which an abnormality occurs between the maximum opening degree and the minimum opening degree of the control valve 20. Therefore, according to the above-described embodiment, it is possible to diagnose the valve system 10 in more detail.

Additionally, in the above-described embodiment, the diagnostic opening degree command value $hi_{\_D}$ increases stepwise from the minimum opening degree (0%) to the maximum opening degree (100%), and then decreases stepwise from the maximum opening degree (100%) to the minimum opening degree (0%). Thus, it is possible to quickly acquire multiple step responses in the range between the minimum opening degree (0%) and the maximum opening degree (100%) for both the opening and closing processes of the control valve 20. Therefore, it is possible to quickly diagnose the valve system 10.

Additionally, in the above-described embodiment, since the information on one or more parameters (operation delay time TD, etc.) associated with the step response of the actual opening degree ho to the step input (I1 to I8) at each step of the multistep diagnostic opening degree command value $hi_{\_D}$ is displayed for each step, it is easy to visually grasp the presence or absence of an abnormality in the valve system 10 or the opening degree range of the control valve 20 in which an abnormality occurs in the valve system 10.

In some embodiments, the preparatory opening degree command value from the control part 40 may be input to the servo module 32 in step S2 (see FIG. 4), and then the diagnostic opening degree command value from the control part 40 may be input to the servo module 32 in step S4. That is, the servo module 32 may be configured to provide the control signal based on the preparatory opening degree command value to the servo valve 30, and then provide the control signal based on the diagnostic opening degree command value to the servo valve 30.

Figure 9:
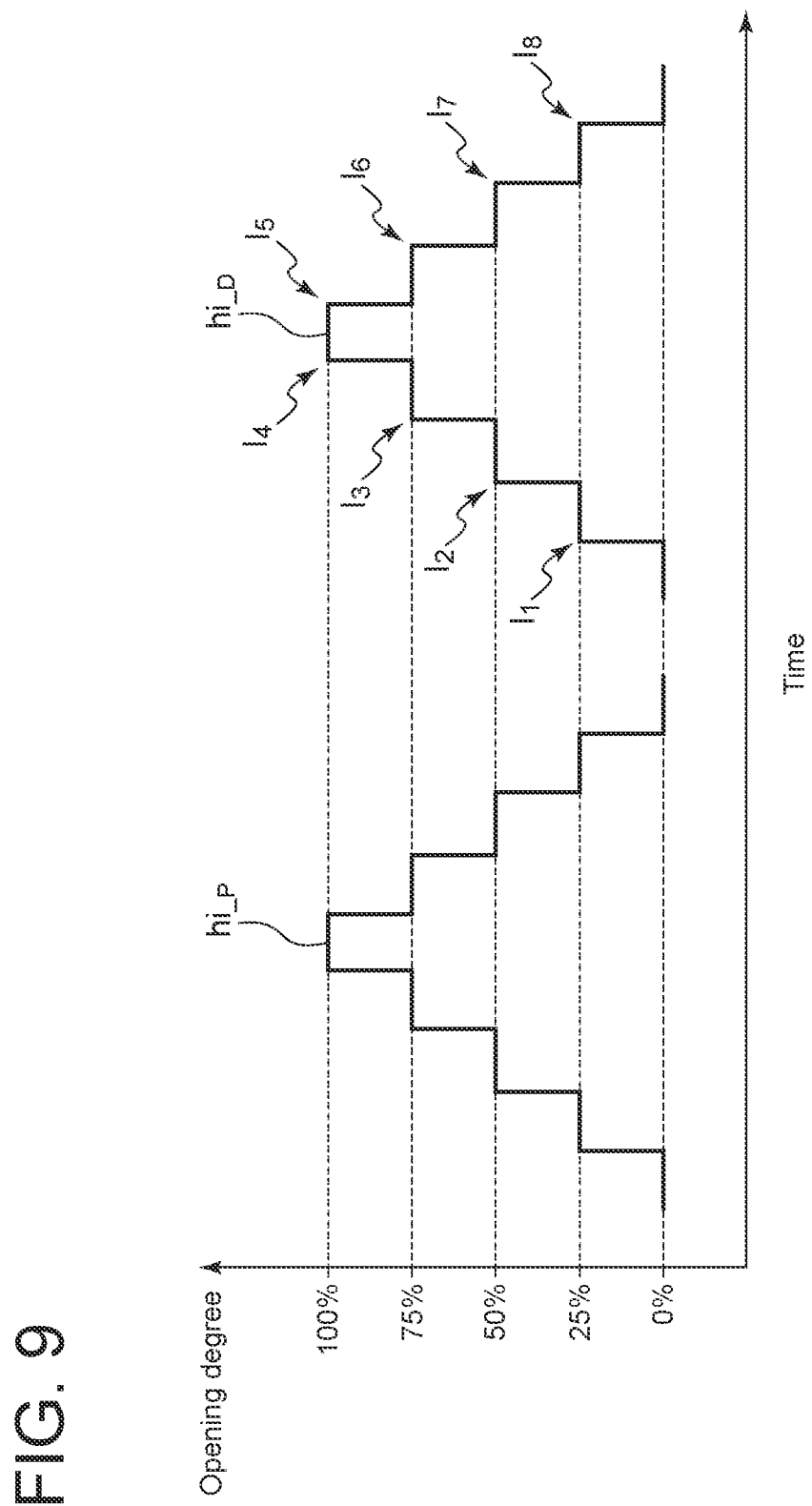
FIG. 9 is a graph showing temporal changes in the opening degree command value (diagnostic opening degree command value and preparatory opening degree command value) input to the servo valve according to an embodiment.
Figure 10:
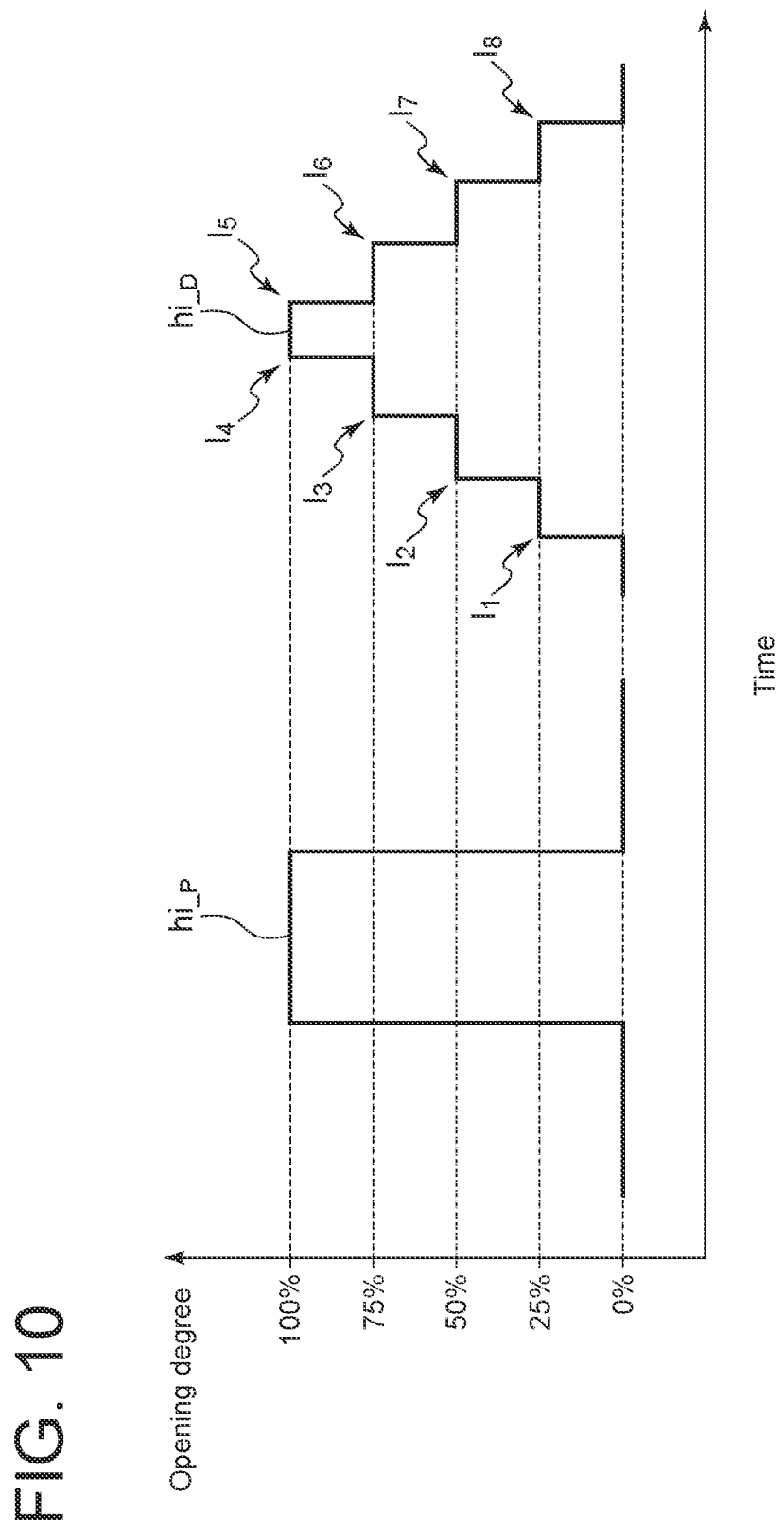
FIG. 10 is a graph showing temporal changes in the opening degree command value (diagnostic opening degree command value and preparatory opening degree command value) input to the servo valve according to an embodiment.

Here, FIGS. 9 and 10 are each a graph showing temporal changes in the opening degree command value (diagnostic opening degree command value and preparatory opening degree command value) input to the servo valve according to an embodiment. As shown in FIGS. 9 and 10, the preparatory opening degree command value $hi_{\_P}$ changes over the range between the minimum opening degree (0% in the above example) and the maximum opening degree (100% in the above example) of the diagnostic opening degree command value $hi_{\_D}$.

The preparatory opening degree command value hip covers the entire range between the minimum opening degree and the maximum opening degree of the diagnostic opening degree command value $hi_{\_D}$, and the way it changes over time is not limited.

In an embodiment, as shown in FIG. 9, the preparatory opening degree command value $hi_{\_P}$ may change in multiple steps. As shown in FIG. 9, the preparatory opening degree command value $hi_{\_P}$ may change in multiple steps in the same manner as the diagnostic opening degree command value $hi_{\_D}$.

In an embodiment, as shown in FIG. 10, the preparatory opening degree command value $hi_{\_P}$ may be a single step input. In this case, the diagnosis of the valve system 10 can be prepared in a shorter time than when the preparatory opening degree command value $hi_{\_P}$ changes in multiple steps.

Alternatively, in an embodiment, the preparatory opening degree command value $hi_{\_P}$ may not be a step input but may change, for example, linearly or curvedly.

According to the above-described embodiment, the control signal based on the preparatory opening degree command value $hi_{\_P}$ is first given to the servo valve 30 to operate the control valve 20 between the minimum opening degree and the maximum opening degree, and then the control signal based on the diagnostic opening degree command value $hi_{\_D}$ is given to the servo valve 30 to diagnose an abnormality of the valve system 10. That is, since the preparatory opening degree command value $hi_{\_P}$ is used for preparatory operations of the control valve 20 prior to diagnosis, the control valve 20 can operate smoothly to some extent. This allows the abnormality diagnosis of the valve system 10 in a state close to the operation of the device (e.g., gas turbine 1) to which the valve system 10 is applied. Therefore, it is possible to diagnose an abnormality of the valve system 10 more appropriately.

Figure 11:
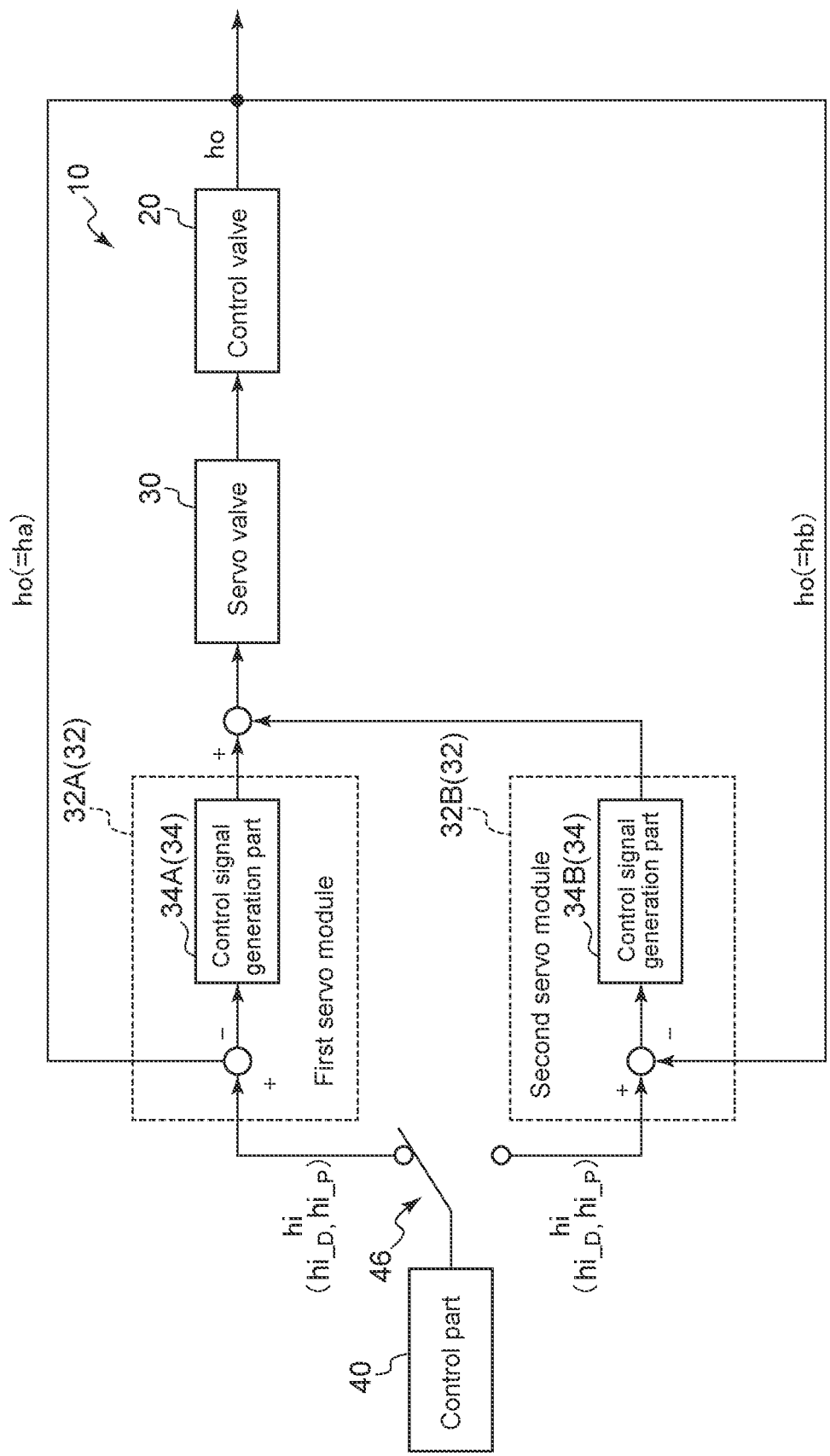
FIG. 11 is a block diagram for the control of a control valve in the valve system according to an embodiment.

FIG. 11 is a block diagram for the control of the control valve in the valve system according to an embodiment. In some embodiments, the valve system 10 to be diagnosed may have the configuration shown in FIG. 11. The valve system 10 shown in FIG. 11 includes a plurality of servo modules 32 (first servo module 32A and second servo module 32B). Further, the control valve 20 is provided with a plurality of opening degree detection parts 26 (first detection part 26A and second detection part 26B; see FIG. 1) for detecting the actual opening degree of the control valve 20.

The first servo module 32A and the second servo module 32B are configured to be switchable with each other. Specifically, a switching part 46 for switching the connection state between the control part 40 and the first servo module 32A or the second servo module 32B may be provided. The opening degree command value hi from the control part 40 is received by either the first servo module 32A or the second servo module 32B according to the state of the switching part 46.

The first detection part 26A is configured to detect the actual opening degree ho (=ha) of the control valve 20 while the opening degree command value from the control part 40 is input to the first servo module 32A. The first servo module 32A receives the above-described opening degree command value hi from the control part 40 and receives a feedback signal indicating the actual opening degree ho (=ha) of the control valve 20 detected by the first detection part 26A.

Further, the second detection part 26B is configured to detect the actual opening degree ho (=hb) of the control valve 20 while the opening degree command value from the control part 40 is input to the second servo module 32B. The second servo module 32B receives the above-described opening degree command value hi from the control part 40 and receives a feedback signal indicating the actual opening degree ho (=hb) of the control valve 20 detected by the second detection part 26B.

The servo valve 30 is configured to drive the control valve 20, based on the control signal from either one of the first servo module 32A or the second servo module 32B.

When the valve system 10 has the above-described configuration, the diagnosis part 44 may be configured to diagnose an abnormality of the valve system 10, based on a detected value of the actual opening degree ho (=ha) of the control valve 20 while the diagnostic opening degree command value $hi_{\_D}$ from the control part 40 is input to the first servo module 32A (i.e., a detected value by the first detection part 26A) and a detected value of the actual opening degree ho (=ha) of the control valve 20 while the diagnostic opening degree command value $hi_{\_D}$ from the control part 40 is input to the second servo module 32B (i.e., a detected value by the second detection part 26B).

Figure 12:
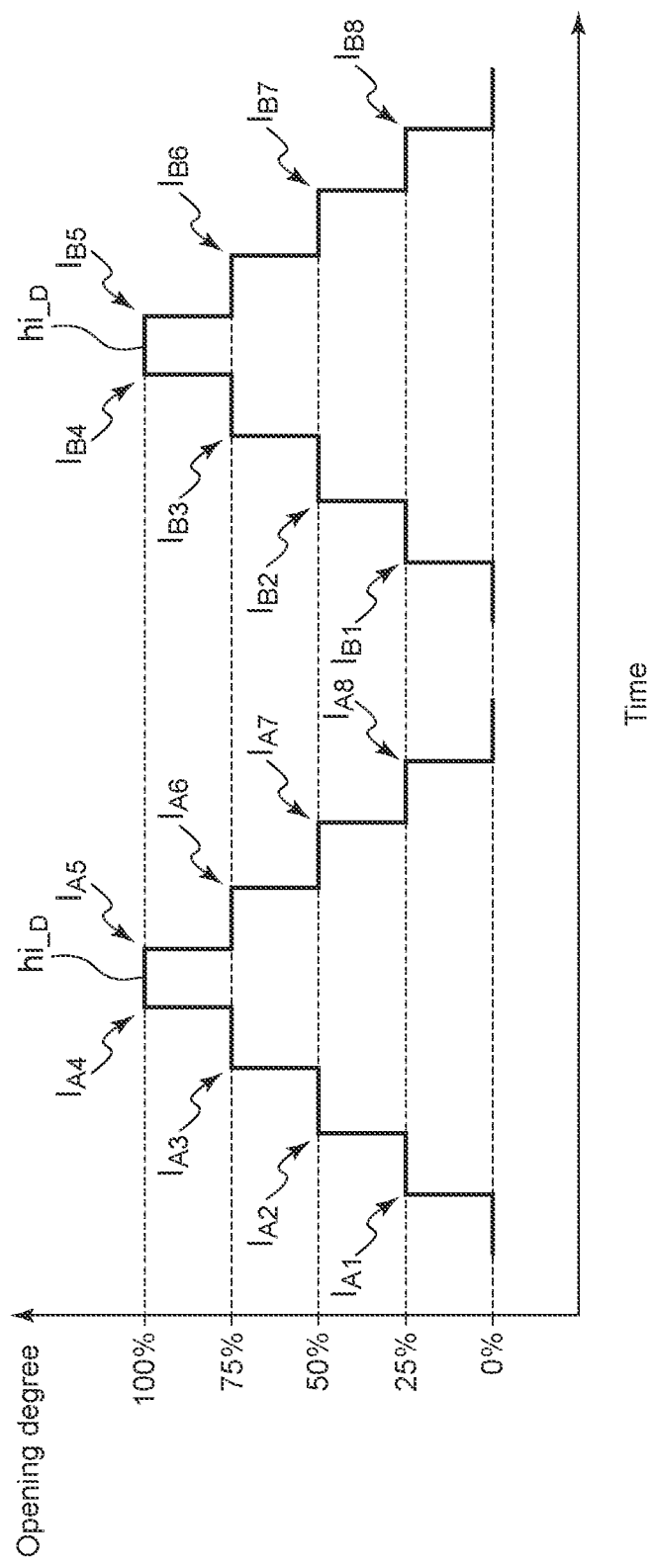
FIG. 12 is a graph showing temporal changes in the opening degree command value (diagnostic opening degree command value) according to an embodiment.

Here, the diagnostic opening degree command values $hi_{\_D}$ input to the first servo module 32A and the second servo module 32B change in multiple steps between the maximum opening degree and the minimum opening degree through one or more intermediate opening degrees, as already described. That is, the opening degree command values sent from the control part 40 to the first servo module 32A and the second servo module 32B may change as shown in FIG. 12. In FIG. 11, multiple step inputs $I_{A1}$ to $I_{A8}$ (corresponding to the above-described I1 to I8, respectively) indicating the diagnostic opening degree command value $hi_{\_D}$ are provided to the first servo module 32A, and then multiple step inputs $I_{B1}$ to $I_{B8}$ (corresponding to the above-described I1 to I8, respectively) indicating the diagnostic opening degree command value $hi_{\_D}$ are provided to the second servo module 32B. FIG. 12 is a graph showing temporal changes in the opening degree command value (diagnostic opening degree command value) according to an embodiment.

By using the above-described diagnostic opening degree command value $hi_D$, multiple step responses of the control valve 20 respectively corresponding to the multiple step inputs $I_{A1}$ to $I_{A8}$ indicating the diagnostic opening degree command value $hi_D$ to the first servo module 32A and multiple step responses of the control valve 20 respectively corresponding to the multiple step inputs $I_{B1}$ to $I_{B8}$ indicating the diagnostic opening degree command value $hi_D$ to the second servo module 32B are obtained. Then, an abnormality of the valve system 10 is diagnosed based on these step responses.

In the above-described embodiment, since the abnormality diagnosis of the valve system 10 is performed using the step signal corresponding to the diagnostic opening degree command value $hi_D$ from each of the two servo modules 32 (first servo module 32A and second servo module 32B), it is possible to diagnose an abnormality of the valve system 10 more reliably. Further, in the above-described embodiment, when an abnormality of the valve system 10 is detected, it is possible to identify which of the control valve 20, the servo valve 30, and the two servo modules 32 (first servo module 32A and second servo module 32B) has the abnormality.

The abnormality diagnosis of the valve system 10 using the diagnostic opening degree command value $hi_D$ to the first servo module 32A and the abnormality diagnosis of the valve system 10 using the diagnostic opening degree command value bio to the second servo module 32B may be performed by the procedure of steps S2 to S22 shown in FIG. 4.

Thus, for example, the preparatory opening degree command value $hi_P$ from the control part 40 may be input to the first servo module 32A (step S2) before the diagnostic opening degree command value $hi_D$ from the control part 40 is input to the first servo module 32A (step S4). Further, the preparatory opening degree command value $hi_P$ from the control part 40 may be input to the second servo module 32B before the diagnostic opening degree command value $hi_D$ from the control part 40 is input to the second servo module 32B (step S4).

In some embodiments, in the above-described step S18, the display part 50 is configured to display a graph showing a relationship between the actual opening degree ho of the control valve 20 after settling and the diagnostic opening degree command value $hi_D$ (target value) in response to the step input (I1 to I8, $I_{A1}$ to $I_{A8}$, or $I_{B1}$ to $I_{B8}$) at each step of the multistep diagnostic opening degree command value $hi_D$.

Figure 13A:
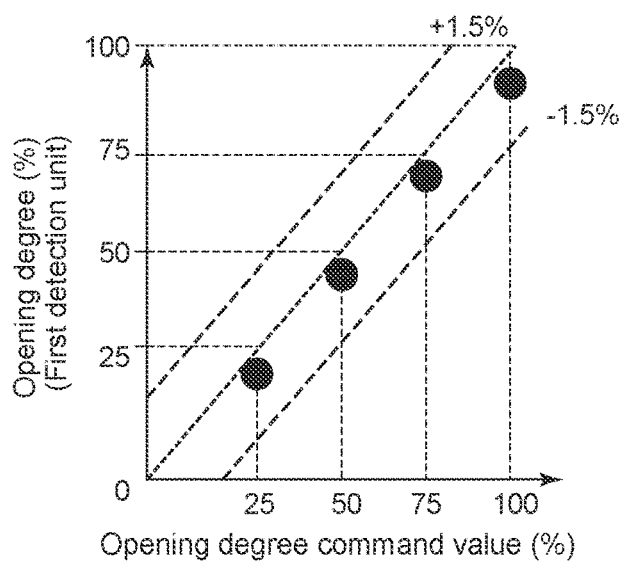
FIG. 13A is a graph showing an example of the relationship between the diagnostic opening degree command value and the actual opening degree when the valve system shown in FIG. 11 is to be diagnosed.
Figure 13B:
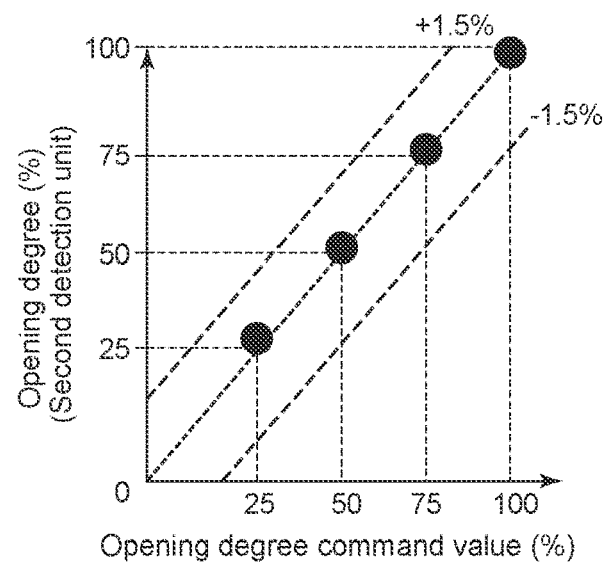
FIG. 13B is a graph showing an example of the relationship between the diagnostic opening degree command value and the actual opening degree when the valve system shown in FIG. 11 is to be diagnosed.

Here, FIGS. 13A and 13B are each a graph showing an example of the relationship between the diagnostic opening degree command value $hi_D$ (target value) and the actual opening degree ho when the valve system 10 shown in FIG. 11 is to be diagnosed. FIG. 13A shows the relationship between the diagnostic opening degree command value $hi_D$ (target value) and the actual opening degree ho (=ha) detected by the first detection part 26A (i.e., the actual opening degree ho when the control valve 20 is driven via the first servo module 32A). FIG. 13B shows the relationship between the diagnostic opening degree command value $hi_D$ and the actual opening degree ho (=hb) detected by the second detection part 26B (i.e., the actual opening degree ho when the control valve 20 is driven via the second servo module 32B).

In the above-described embodiment, as shown in FIGS. 13A and 13B, since a graph showing the relationship between the actual opening degree ho after settling and the diagnostic opening degree command value (target value) is displayed for each step (e.g., I1 to I8) of the multistep diagnostic opening degree command value $hi_D$, it is easy to visually grasp the presence or absence of an abnormality in the valve system 10 or the opening degree range of the control valve in which an abnormality occurs in the valve system 10. For example, when there is a large deviation between the detected value of the actual opening degree ho by the opening degree detection part 26 and the diagnostic opening degree command value (target value), it is possible to easily determine that the valve system 10 has an abnormality.

Figure 13C:
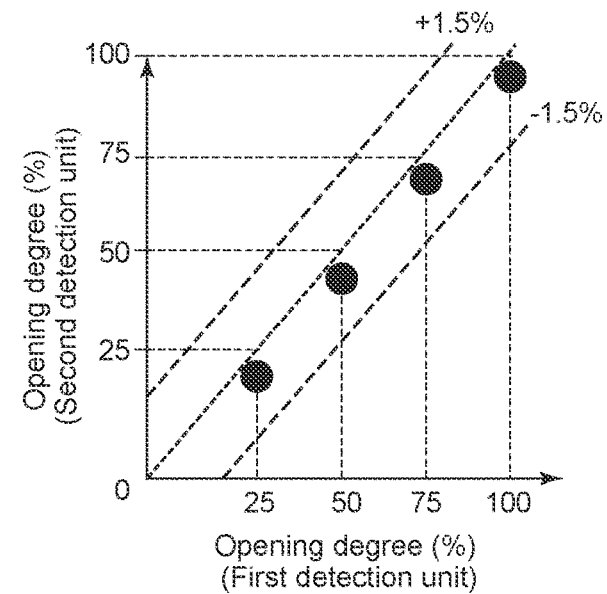
FIG. 13C is a graph showing an example of the relationship between the actual opening degree detected by the first detection part and the actual opening degree detected by the second detection part.

FIG. 13C is a graph showing an example of the relationship between the actual opening degree ho (=ha) detected by the first detection part 26A and the actual opening degree ho (=hb) detected by the second detection part 26B when the control valve 20 is driven based on the same diagnostic opening degree command value $hi_D$.

If there is no abnormality in the first servo module 32A and the second servo module 32B, for example, as shown in FIG. 13C, the relationship between the actual opening degree ho (=ha) detected by the first detection part 26A and the actual opening degree ho (=hb) detected by the second detection part 26B is expected to be a straight line with slope 1 through the origin. On the other hand, if there is an abnormality in either the first servo module 32A or the second servo module 32B, the relationship between the actual opening degree ho (=ha) and the actual opening degree ho (=hb) is expected to deviate from the linear shape with slope 1 through the origin. Therefore, in such a case, it can be determined that an abnormality has occurred in any of the two servo modules 32 (first servo module 32A and second servo module 32B). Further, it is possible to identify which of the two servo modules 32 (first servo module 32A and second servo module 32B) has the abnormality.

The contents described in the above embodiments would be understood as follows, for instance.

(1) A diagnosis apparatus (42) for a valve system (10) according to at least one embodiment of the present invention is a diagnosis apparatus for a valve system including a control valve (20), a servo valve (30) for driving the control valve, and at least one servo module (32) for providing a control signal based on an opening degree command value for the control valve to the servo valve. The diagnosis apparatus includes: at least one opening degree detection part (26) configured to detect an actual opening degree of the control valve; and a diagnosis part (44) configured to acquire, from the opening degree detection part, a detected value of the actual opening degree of the control valve while a diagnostic opening degree command value is input to the at least one servo module, and diagnose an abnormality of the valve system on the basis of the detected value. The diagnostic opening degree command value changes in multiple steps between a maximum opening degree and a minimum opening degree through one or more intermediate opening degrees.

With the above configuration (1), since the abnormality diagnosis is performed using the control signal corresponding to the diagnostic opening degree command value covering the entire range between the maximum opening degree and the minimum opening degree of the control valve, an abnormality of the fuel valve can be easily detected without omission. Additionally, since the diagnosis is made using the control signal (step signal) corresponding to the diagnostic opening degree command value (step input) which changes in multiple steps between the maximum opening degree and the minimum opening degree of the control valve, by evaluating the step response for each step of the multiple step inputs, it is possible to identify which step of the step inputs has caused the detected abnormality. Thus, it is possible to identify the range in which an abnormality occurs between the maximum opening degree and the minimum opening degree of the control valve. Therefore, with the above configuration (1), it is possible to diagnose the valve system in more detail.

(2) In some embodiments, in the above configuration (1), the diagnostic opening degree command value increases stepwise from the minimum opening degree to the maximum opening degree, or decreases stepwise from the maximum opening degree to the minimum opening degree.

With the above configuration (2), the diagnostic opening degree command value increases stepwise from the minimum opening degree to the maximum opening degree, or decreases stepwise from the maximum opening degree to the minimum opening degree. Thus, it is possible to quickly acquire multiple step responses in the range between the minimum opening degree and the maximum opening degree. Therefore, it is possible to quickly diagnose the valve system.

(3) In some embodiments, in the above configuration (1) or (2), the diagnostic opening degree command value increases stepwise from the minimum opening degree to the maximum opening degree, and then decreases stepwise from the maximum opening degree to the minimum opening degree.

With the above configuration (3), since the diagnostic opening degree command value increases stepwise from the minimum opening degree to the maximum opening degree, and then decreases stepwise from the maximum opening degree to the minimum opening degree, it is possible to quickly acquire multiple step responses in the range between the minimum opening degree and the maximum opening degree for both the opening and closing processes of the control valve. Therefore, it is possible to quickly diagnose the valve system.

(4) In some embodiments, in any one of the above configurations (1) to (3), the at least one servo module includes a first servo module (32A) and a second servo module (32B) which are configured to be switchable with each other. The at least one opening degree detection part includes a first detection part (26A) configured to detect an actual opening degree of the control valve while the diagnostic opening degree command value is input to the first servo module, and a second detection part (26B) configured to detect an actual opening degree of the control valve while the diagnostic opening degree command value is input to the second servo module. The diagnosis part is configured to diagnose an abnormality of the valve system on the basis of a first detected value of the actual opening degree acquired from the first detection part and a second detected value of the actual opening degree acquired from the second detection part.

With the above configuration (4), since the abnormality diagnosis of the valve system is performed using the step signal corresponding to the diagnostic opening degree command value from each of the two servo modules (first servo module and second servo module), it is possible to diagnose an abnormality of the valve system more reliably. Further, when an abnormality of the valve system is detected, it is possible to identify which of the fuel valve and the two servo modules has the abnormality.

(5) In some embodiments, in any one of the above configurations (1) to (4), the servo module is configured to provide the control signal based on a preparatory opening degree command value to the servo valve, and then provide the control signal based on the diagnostic opening degree command value to the servo valve. The preparatory opening degree command value changes over a range between the minimum opening degree and the maximum opening degree.

With the above configuration (5), the control signal based on the preparatory opening degree command value is first given to the servo valve to operate the control valve between the minimum opening degree and the maximum opening degree, and then the control signal based on the diagnostic opening degree command value is given to the servo valve to diagnose an abnormality of the valve system. That is, since the preparatory opening degree command value is used for preparatory operations of the control valve prior to diagnosis, the control valve can operate smoothly to some extent. This allows the abnormality diagnosis of the valve system in a state close to the operation of the device to which the valve system is applied. Therefore, it is possible to diagnose an abnormality of the valve system more appropriately.

(6) in some embodiments, in any one of the above configurations (1) to (5), the diagnosis part is configured to diagnose an abnormality of the valve system, on the basis of one or more parameters associated with a step response of the actual opening degree to a step input at each step of the multistep diagnostic opening degree command value.

With the above configuration (6), it is possible to diagnose an abnormality of the valve system, based on one or more parameters associated with the step response of the actual opening degree to the step input at each step of the multistep diagnostic opening degree command value.

(7) In some embodiments, in the above configuration (6), the one or more parameters associated with the step response includes delay time, overshoot amount, settling time, or residual deviation of the actual opening degree.

With the above configuration (7), it is possible to diagnose an abnormality of the valve system appropriately, based on the delay time, overshoot amount, settling time, or residual deviation of the step response of the actual opening degree to the step input at each step of the multistep diagnostic opening degree command value.

In some embodiments, in the above configuration (6) or (7), the diagnosis part is configured to determine the presence or absence of an abnormality of the valve system, on the basis of a comparison between the one or more parameters associated with the step response and a threshold.

With the above configuration (8), it is possible to diagnose an abnormality of the valve system, based on a comparison between one or more parameters associated with the step response of the actual opening degree to the step input at each step of the multistep diagnostic opening degree command value and the threshold.

(9) In some embodiments, in any one of the above configurations (1) to (8), the diagnosis apparatus includes a display part (50) configured to display, for each step, information on one or more parameters associated with a step response of the actual opening degree to a step input at each step of the multistep diagnostic opening degree command value.

With the above configuration (9), since the information on one or more parameters associated with the step response of the actual opening degree to the step input at each step of the multistep diagnostic opening degree command value is displayed for each step, it is easy to visually grasp the presence or absence of an abnormality in the valve system or the opening degree range of the control valve in which an abnormality occurs in the valve system.

(10) In some embodiments, in the above configuration (9), the display part is configured to display a graph showing a relationship between the actual opening degree after settling and the diagnostic opening degree command value for a step input at each step of the multistep diagnostic opening degree command value.

With the above configuration (10), since a graph showing the relationship between the actual opening degree after settling and the diagnostic opening degree command value is displayed for each step of the multistep diagnostic opening degree command value, it is easy to visually grasp the presence or absence of an abnormality in the valve system or the opening degree range of the control valve in which an abnormality occurs in the valve system.

(11) A diagnosis method for a valve system according to at least one embodiment of the present invention is a diagnosis method for a valve system (10) including a control valve (20), a servo valve (30) for driving the control valve, and at least one servo module (32) for providing a control signal based on an opening degree command value for the control valve to the servo valve. The diagnosis method includes: a step (S4) of inputting, to the at least one servo module, a diagnostic opening degree command value which changes in multiple steps between a maximum opening degree and a minimum opening degree through one or more intermediate opening degrees; a step (S6) of acquiring a detected value of an actual opening degree of the control valve while the diagnostic opening degree command value is input to the at least one servo module; and a step (S8 to S22) of diagnosing an abnormality of the valve system on the basis of the detected value.

With the above method (11), since the abnormality diagnosis is performed using the step signal (control signal) corresponding to the diagnostic opening degree command value covering the entire range between the maximum opening degree and the minimum opening degree of the control valve, an abnormality of the fuel valve can be easily detected without omission. Additionally, since the diagnosis is made using the step signal corresponding to the diagnostic opening degree command value which changes in multiple steps between the maximum opening degree and the minimum opening degree of the control valve, by evaluating the step response for each step of the multiple step signals, it is possible to identify which step of the step signals has caused the detected abnormality. Thus, it is possible to identify the range in which an abnormality occurs between the maximum opening degree and the minimum opening degree of the control valve. Therefore, with the above method (11), it is possible to diagnose the valve system in more detail.

(12) A diagnosis program for a valve system according to at least one embodiment of the present invention is a diagnosis program for a valve system (10) including a control valve (20), a servo valve (30) for driving the control valve, and at least one servo module (32) for providing a control signal based on an opening degree command value for the control valve to the servo valve. The diagnosis program is configured to cause a computer to execute: a process of inputting, to the at least one servo module, a diagnostic opening degree command value which changes in multiple steps between a maximum opening degree and a minimum opening degree through one or more intermediate opening degrees; a process of acquiring a detected value of an actual opening degree of the control valve while the diagnostic opening degree command value is input to the at least one servo module; and a process of diagnosing an abnormality of the valve system on the basis of the detected value.

With the above program (12), since the abnormality diagnosis is performed using the step signal (control signal) corresponding to the diagnostic opening degree command value covering the entire range between the maximum opening degree and the minimum opening degree of the control valve, an abnormality of the fuel valve can be easily detected without omission. Additionally, since the diagnosis is made using the step signal corresponding to the diagnostic opening degree command value which changes in multiple steps between the maximum opening degree and the minimum opening degree of the control valve, by evaluating the step response for each step of the multiple step signals, it is possible to identify which step of the step signals has caused the detected abnormality. Thus, it is possible to identify the range in which an abnormality occurs between the maximum opening degree and the minimum opening degree of the control valve. Therefore, with the above program (12), it is possible to diagnose the valve system in more detail.

Embodiments of the present invention were described in detail above, but the present invention is not limited thereto, and various amendments and modifications may be implemented.

Further, in the present specification, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", and "have" are not intended to be exclusive of other components.

REFERENCE SIGNS LIST

1 Gas turbine
2 Compressor
4 Combustor
6 Turbine
8 Fuel supply line
10 Valve system
20 Control valve
22 Cylinder
24 Piston
26 Opening degree detection part
26A First detection part
26B Second detection part
30 Servo valve
32 Servo module
32A First servo module
32B Second servo module
34 Control signal generation part 40 Control part
42 Diagnosis apparatus
44 Diagnosis part
46 Switching part
50 Display part

The invention claimed is:

1. A diagnosis apparatus for a valve system including a control valve, a servo valve for driving the control valve, and at least one servo module for providing a control signal based on an opening degree command value for the control valve to the servo valve, the diagnosis apparatus comprising:
   at least one opening degree detection part configured to detect an actual opening degree of the control valve; and
   a diagnosis part configured to acquire, from the opening degree detection part, a detected value of the actual opening degree of the control valve while a first opening degree command value is input to the at least one servo module, and diagnose an abnormality of the valve system on the basis of the detected value,
   wherein the first opening degree command value changes in multiple steps between a maximum opening degree and a minimum opening degree through one or more predetermined intermediate opening degrees,
   wherein the servo module is configured to provide the control signal based on a second opening degree command value to the servo valve to cause the control valve to perform a preparatory operation, and then provide the control signal based on the first opening degree command value to the servo valve, and
   wherein the second opening degree command value changes over a range between the minimum opening degree and the maximum opening degree.

2. The diagnosis apparatus for the valve system according to claim 1,
   wherein the first opening degree command value increases stepwise from the minimum opening degree to the maximum opening degree, or decreases stepwise from the maximum opening degree to the minimum opening degree.

3. The diagnosis apparatus for the valve system according to claim 1,
   wherein the first opening degree command value increases stepwise from the minimum opening degree to the maximum opening degree, and then decreases stepwise from the maximum opening degree to the minimum opening degree.

4. The diagnosis apparatus for the valve system according to claim 1,
   wherein the at least one servo module includes a first servo module and a second servo module which are configured to be switchable with each other,
   wherein the at least one opening degree detection part includes a first detection part configured to detect an actual opening degree of the control valve while the first opening degree command value is input to the first servo module, and a second detection part configured to detect an actual opening degree of the control valve while the first opening degree command value is input to the second servo module, and
   wherein the diagnosis part is configured to diagnose an abnormality of the valve system on the basis of a first detected value of the actual opening degree acquired from the first detection part and a second detected value of the actual opening degree acquired from the second detection part.

5. The diagnosis apparatus for the valve system according to claim 1,
   wherein the diagnosis part is configured to diagnose an abnormality of the valve system, on the basis of one or more parameters associated with each step response of the actual opening degree to a step input at each step of the multistep first opening degree command value.

6. The diagnosis apparatus for the valve system according to claim 5,
   wherein the one or more parameters associated with the step response includes delay time, overshoot amount, settling time, or residual deviation of the actual opening degree.

7. The diagnosis apparatus for the valve system according to claim 5,
   wherein the diagnosis part is configured to determine the presence or absence of an abnormality of the valve system, on the basis of a comparison between the one or more parameters associated with the step response and a threshold.

8. The diagnosis apparatus for the valve system according to claim 1, comprising a display part configured to display, for each step, information on one or more parameters associated with a step response of the actual opening degree to a step input at each step of the multistep first opening degree command value.

9. The diagnosis apparatus for the valve system according to claim 8,
   wherein the display part is configured to display a graph showing a relationship between the actual opening degree after settling and the first opening degree command value for a step input at each step of the multistep first opening degree command value.

10. The diagnosis apparatus for the valve system according to claim 1, wherein the diagnosis part is configured to determine, based on a step response for each step of multiple step inputs of the multistep first opening degree command value, an opening degree range in which an abnormality has occurred between the maximum opening degree and the minimum opening degree of the control valve.

11. A diagnosis method for a valve system including a control valve, a servo valve for driving the control valve, and at least one servo module for providing a control signal based on an opening degree command value for the control valve to the servo valve, the diagnosis method comprising:
   a step of inputting, to the at least one servo module, a first opening degree command value which changes in multiple steps between a maximum opening degree and a minimum opening degree through one or more predetermined intermediate opening degrees;
   a step of acquiring a detected value of an actual opening degree of the control valve while the first opening degree command value is input to the at least one servo module;
   a step of diagnosing an abnormality of the valve system on the basis of the detected value; and
   a step of, by using the servo module, providing the control signal based on a second opening degree command value to the servo valve to cause the control valve to perform a preparatory operation, and then providing the control signal based on the first opening degree command value to the servo valve, and
   wherein the second opening degree command value changes over a range between the minimum opening degree and the maximum opening degree.

12. A diagnosis program for a valve system including a control valve, a servo valve for driving the control valve, and at least one servo module for providing a control signal based on an opening degree command value for the control valve to the servo valve, the diagnosis program being configured to cause a computer to execute:
- a process of inputting, to the at least one servo module, a first opening degree command value which changes in multiple steps between a maximum opening degree and a minimum opening degree through one or more predetermined intermediate opening degrees;
- a process of acquiring a detected value of an actual opening degree of the control valve while the first opening degree command value is input to the at least one servo module;
- a process of diagnosing an abnormality of the valve system on the basis of the detected value; and
- a process of, by using the servo module, providing the control signal based on a second opening degree command value to the servo valve to cause the control valve to perform a preparatory operation, and then providing the control signal based on the first opening degree command value to the servo valve, and
- wherein the second opening degree command value changes over a range between the minimum opening degree and the maximum opening degree.

* * * * *